(12) United States Patent
Davies et al.

(10) Patent No.: US 12,075,021 B2
(45) Date of Patent: Aug. 27, 2024

(54) PROJECTION SYSTEM AND METHOD WITH BLENDED COLOR GAMUT

(71) Applicant: Dolby Laboratories Licensing Corporation, San Francisco, CA (US)

(72) Inventors: Trevor Davies, Walnut Creek, CA (US); Clement Luc Carol Le Barbenchon, Los Angeles, CA (US); Elizabeth Dovale, San Francisco, CA (US); Martin J. Richards, Gig Harbor, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 36 days.

(21) Appl. No.: 17/793,864

(22) PCT Filed: Jan. 28, 2021

(86) PCT No.: PCT/US2021/015569
§ 371 (c)(1),
(2) Date: Jul. 19, 2022

(87) PCT Pub. No.: WO2021/155056
PCT Pub. Date: Aug. 5, 2021

(65) Prior Publication Data
US 2023/0078910 A1 Mar. 16, 2023

Related U.S. Application Data

(60) Provisional application No. 63/125,160, filed on Dec. 14, 2020, provisional application No. 62/967,821, filed on Jan. 30, 2020.

(51) Int. Cl.
*H04N 13/363* (2018.01)
*H04N 9/31* (2006.01)

(52) U.S. Cl.
CPC ......... *H04N 13/363* (2018.05); *H04N 9/3182* (2013.01)

(58) Field of Classification Search
CPC .. H04N 13/363; H04N 9/3182; H04N 9/3147; H04N 13/334
See application file for complete search history.

(56) References Cited

U.S. PATENT DOCUMENTS

| | | | |
|---|---|---|---|
| 8,115,787 B2 * | 2/2012 | Ben-Chorin | G09G 5/02 345/691 |
| 8,884,994 B2 * | 11/2014 | Brown Elliott | G09G 3/3426 345/102 |

(Continued)

FOREIGN PATENT DOCUMENTS

| | | |
|---|---|---|
| CN | 101339356 A | 1/2009 |
| CN | 102272657 B | 9/2013 |

(Continued)

*Primary Examiner* — Michael Le

(57) ABSTRACT

A projection system and method therefore related to a first projection device; a second projection device; at least one spatial modulator; and an electronic processor configured to: receive a two-dimensional video data, generate a first plurality of intensity values of a first color gamut and a second plurality of intensity values of a second color gamut, subtract a luminance threshold from a plurality of pixel values of the second color gamut to yield a plurality of positive pixel values and a plurality of negative pixel values, set respective ones of the plurality of pixel values to predetermined values to obtain a residual of the second color gamut, add the residual to the first color gamut, add maximized pixel values to the first color gamut and the second color gamut to create an output gamut, and blend the output gamut with a native color gamut to generate a blended gamut.

14 Claims, 10 Drawing Sheets

(56) References Cited

U.S. PATENT DOCUMENTS

| | | | |
|---|---|---|---|
| 2003/0231260 A1* | 12/2003 | Pate | G02B 26/008 |
| | | | 348/602 |
| 2005/0185839 A1 | 8/2005 | Matsubara | |
| 2008/0252797 A1* | 10/2008 | Hamer | H04N 9/64 |
| | | | 348/E9.037 |
| 2009/0190095 A1* | 7/2009 | Ellinger | H04N 13/324 |
| | | | 359/464 |
| 2012/0194578 A1* | 8/2012 | Znamenskiy | G09G 3/3413 |
| | | | 345/694 |
| 2013/0093783 A1 | 4/2013 | Sullivan | |
| 2014/0028699 A1* | 1/2014 | Kurtz | H04N 9/3182 |
| | | | 345/590 |
| 2015/0356945 A1* | 12/2015 | Fazzini | G09G 5/02 |
| | | | 345/590 |
| 2022/0046217 A1 | 2/2022 | Penna | |

FOREIGN PATENT DOCUMENTS

| | | | | |
|---|---|---|---|---|
| CN | 102023465 B | 1/2014 | | |
| CN | 104536252 A | 4/2015 | | |
| CN | 105612737 B | 4/2019 | | |
| EP | 0594370 B1 | 1/2000 | | |
| WO | 2007139189 A1 | 12/2007 | | |
| WO | 2017223355 A1 | 12/2017 | | |
| WO | WO-2017223355 A1 * | 12/2017 | | G09G 3/003 |

* cited by examiner

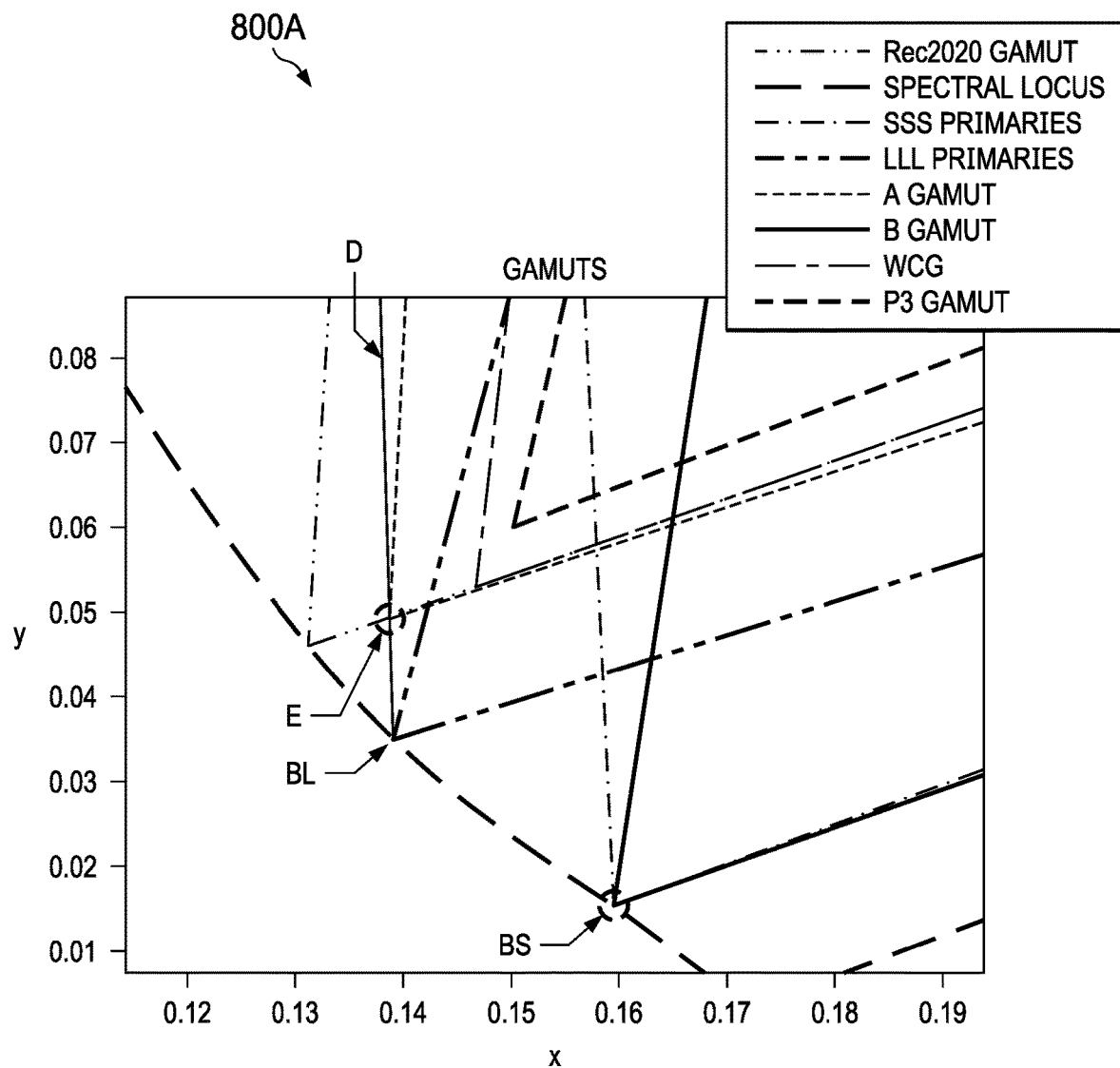

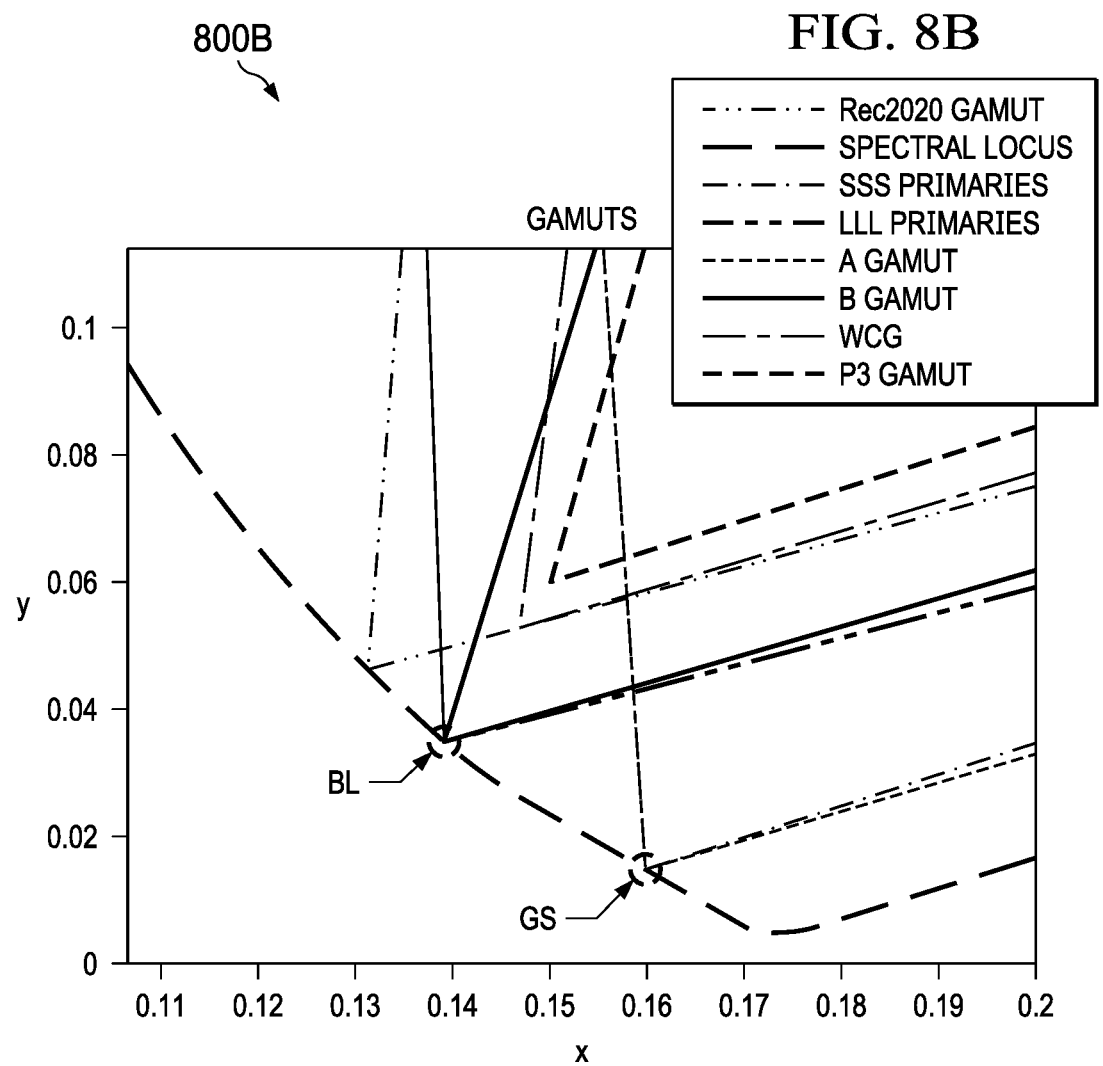

PROJECTION SYSTEM AND METHOD WITH BLENDED COLOR GAMUT

CROSS-REFERENCE TO RELATED APPLICATIONS

This application claims priority to U.S. Provisional Patent Application No. 62/967,821 filed 30 Jan. 2020, and U.S. Provisional Patent Application No. 63/125,160 filed 14 Dec. 2020, which are incorporated herein by reference.

BACKGROUND

1. Field of the Disclosure

This application relates generally to systems and methods of rendering and projecting images.

2. Description of Related Art

Displays capable of displaying three-dimensional (3D) images may display a left eye image and a right eye image using two distinct sets of primaries ("six primaries" or 6P) which, when viewed together, give the appearance of a 3D image. Such displays may also be utilized to display two-dimensional (2D) images.

BRIEF SUMMARY OF THE DISCLOSURE

Various aspects of the present disclosure relate to devices, systems, and methods for rendering wide color gamut images.

In one exemplary aspect of the present disclosure, there is provided a projection system comprising a first projection device, a second projection device, at least one spatial modulator, and an electronic processor configured to: receive a two-dimensional video data; generate, from the video data, a first plurality of intensity values of virtual primaries of a first color gamut and a second plurality of intensity values of virtual primaries of a second color gamut; subtract a luminance threshold from a plurality of pixel values of the second color gamut to yield a plurality of positive pixel values and a plurality of negative pixel values; set respective ones of the plurality of negative pixel values of the second color gamut to predetermined values to obtain a residual of the second color gamut; add the residual of the second color gamut to the first color gamut; add maximized pixel values to the first color gamut and the second color gamut within the two-dimensional video data to create an output gamut; blend the output gamut with a native color gamut of the projection system to generate a blended gamut; and drive the first projection device and the second projection device based on the blended gamut.

In another exemplary aspect of the present disclosure, there is provided a method of rendering wide color gamut images with a projection system, the projection system including a first projection device, a second projection device, and at least one spatial modulator, the method comprising: receiving a two-dimensional video data, generating, from the video data, a first plurality of intensity values of virtual primaries of a first color gamut and a second plurality of intensity values of virtual primaries of a second color gamut, subtracting a luminance threshold from a plurality of pixel values of the second color gamut to yield a plurality of positive pixel values and a plurality of negative pixel values, setting respective ones of the plurality of negative pixel values of the second color gamut predetermined values to obtain a residual of the second color gamut, adding the residual of the second color gamut to the first color gamut, adding maximized pixel values to the first color gamut and the second color gamut within the two-dimensional image data to create an output gamut, blending the output gamut with a native color gamut of the projection system to generate a blended gamut, and driving the first projection device and the second projection device based on the blended gamut.

In another exemplary aspect of the present disclosure, there is provided a non-transitory computer-readable medium storing instructions that, when executed by a processor of a projection system including a first projection device, a second projection device, and at least one spatial modulator, cause the projection system to perform operations comprising receiving a two-dimensional video data, generating, from the video data, a first plurality of intensity values of virtual primaries of a first color gamut and a second plurality of intensity values of virtual primaries of a second color gamut, subtracting a luminance threshold from a plurality of pixel values of the second color gamut to yield a plurality of positive pixel values and a plurality of negative pixel values, setting respective ones of the plurality of negative pixel values of the second color gamut to predetermined values to obtain a residual of the second color gamut, adding the residual of the second color gamut to the first color gamut, adding maximized pixel values to the first color gamut and the second color gamut within the two-dimensional image data to create an output gamut, blending the output gamut with a native color gamut of the projection system to generate a blended gamut, and driving the first projection device and the second projection device based on the blended gamut.

In this manner, various aspects of the present disclosure provide for the display of images having a high dynamic range, high resolution, and wide color gamut, and effect improvements in at least the technical fields of image projection, holography, signal processing, and the like.

DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

Figure 1A:
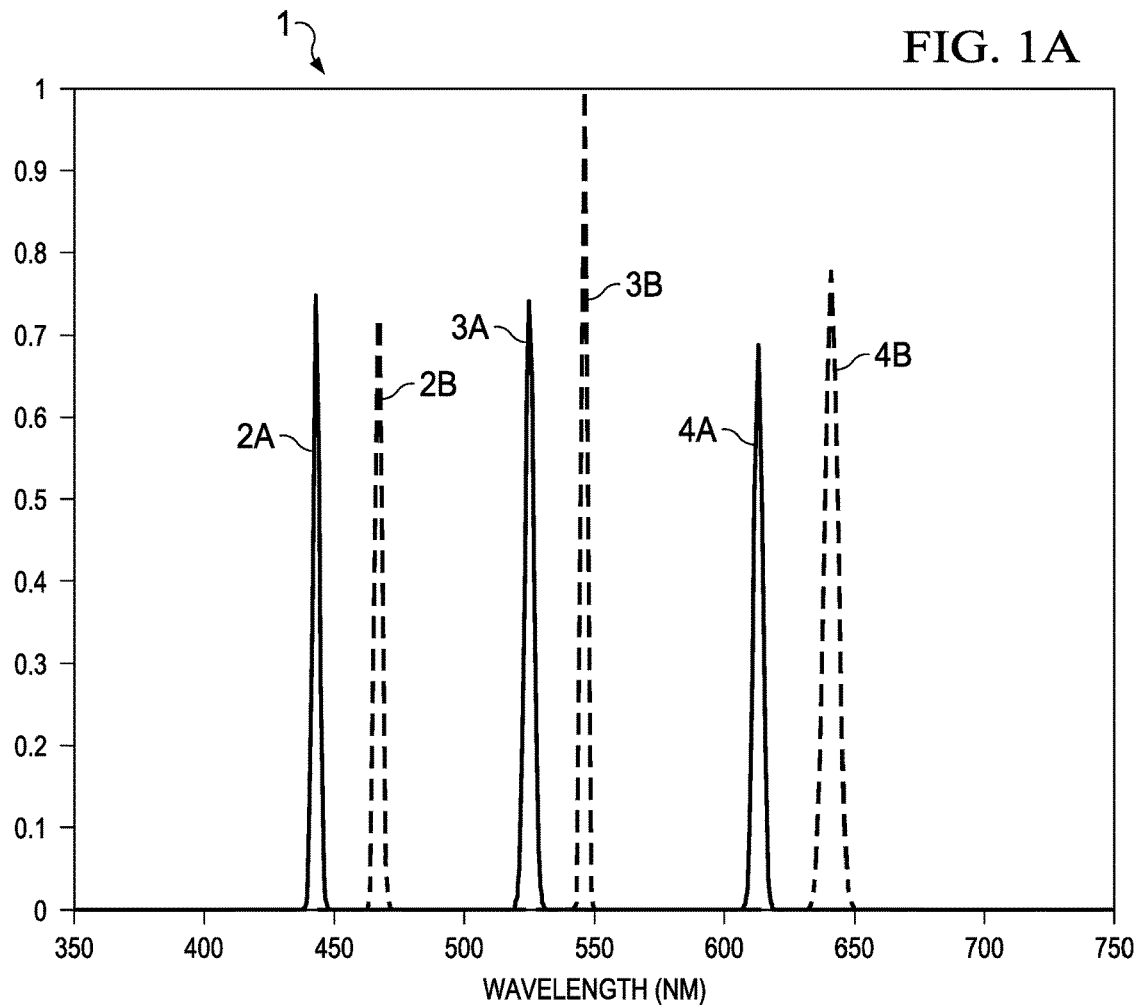

The apparatus and method components have been represented where appropriate by symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1A is a spectrum diagram of an exemplary 6P projection system according to various aspects of the present disclosure.

Figure 1B:
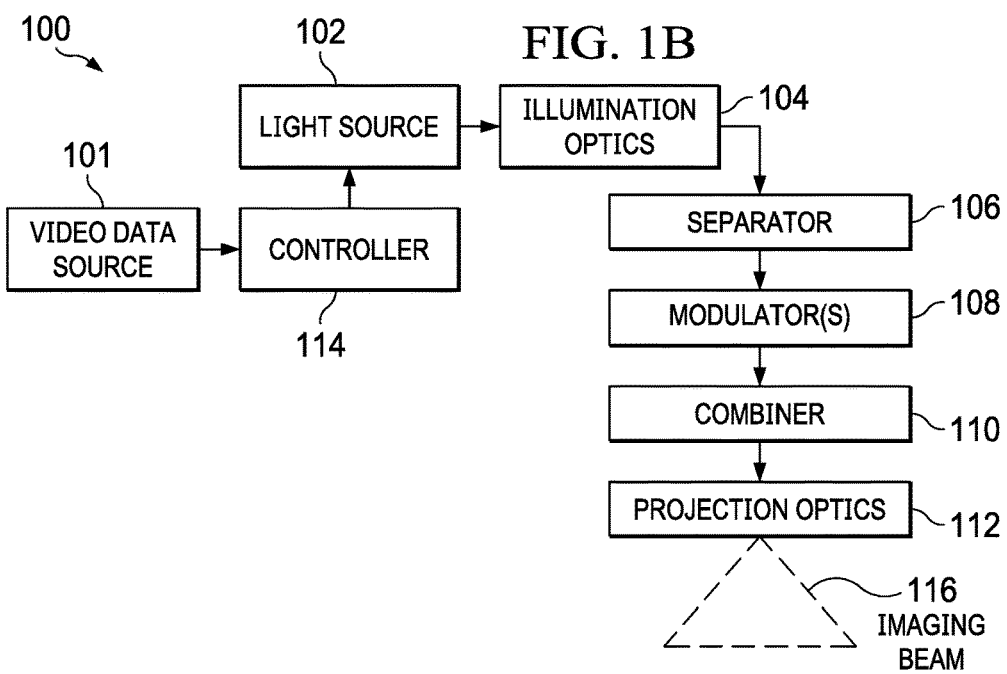

FIG. 1B is a block diagram of an exemplary projection system according to various aspects of the present disclosure.

Figure 1C:
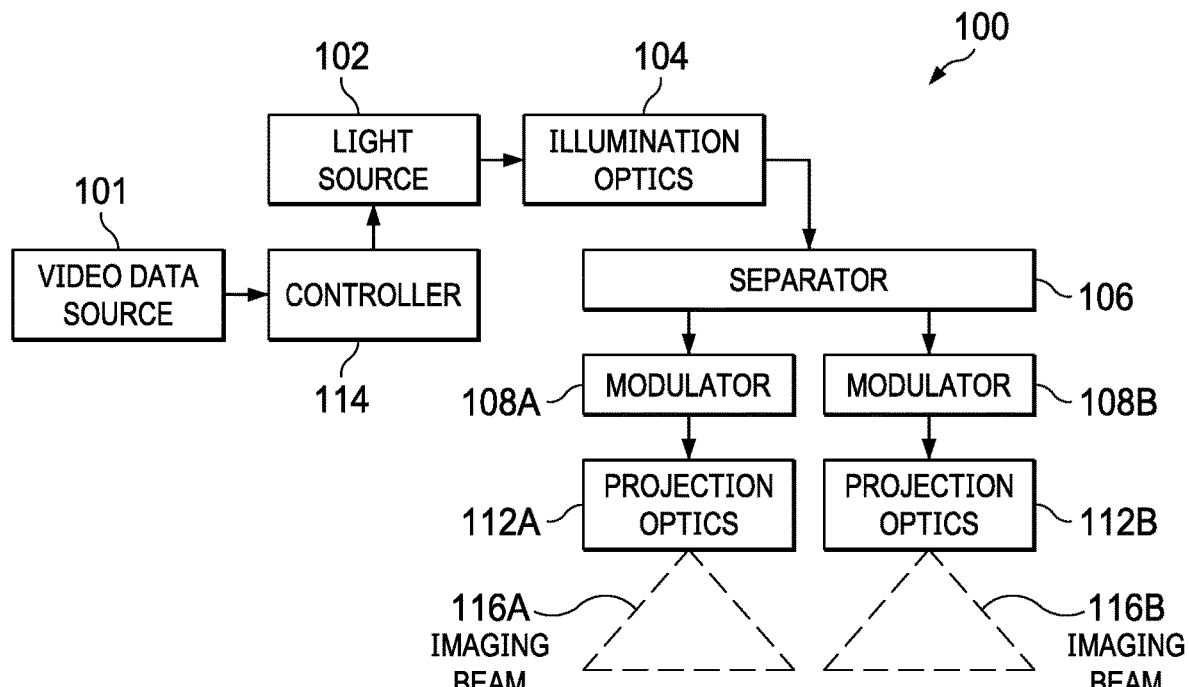

FIG. 1C is a block diagram of an exemplary projection system according to various aspects of the present disclosure.

Figure 2:
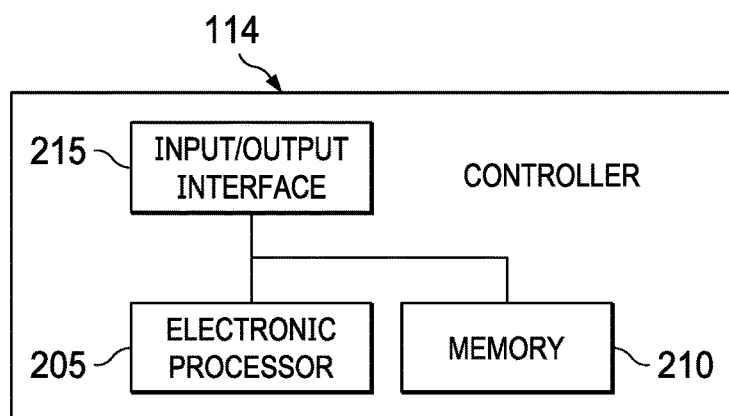

FIG. 2 is a block diagram of an exemplary controller included in the system of FIGS. 1B and 1C according to various aspects of the present disclosure.

Figure 3:
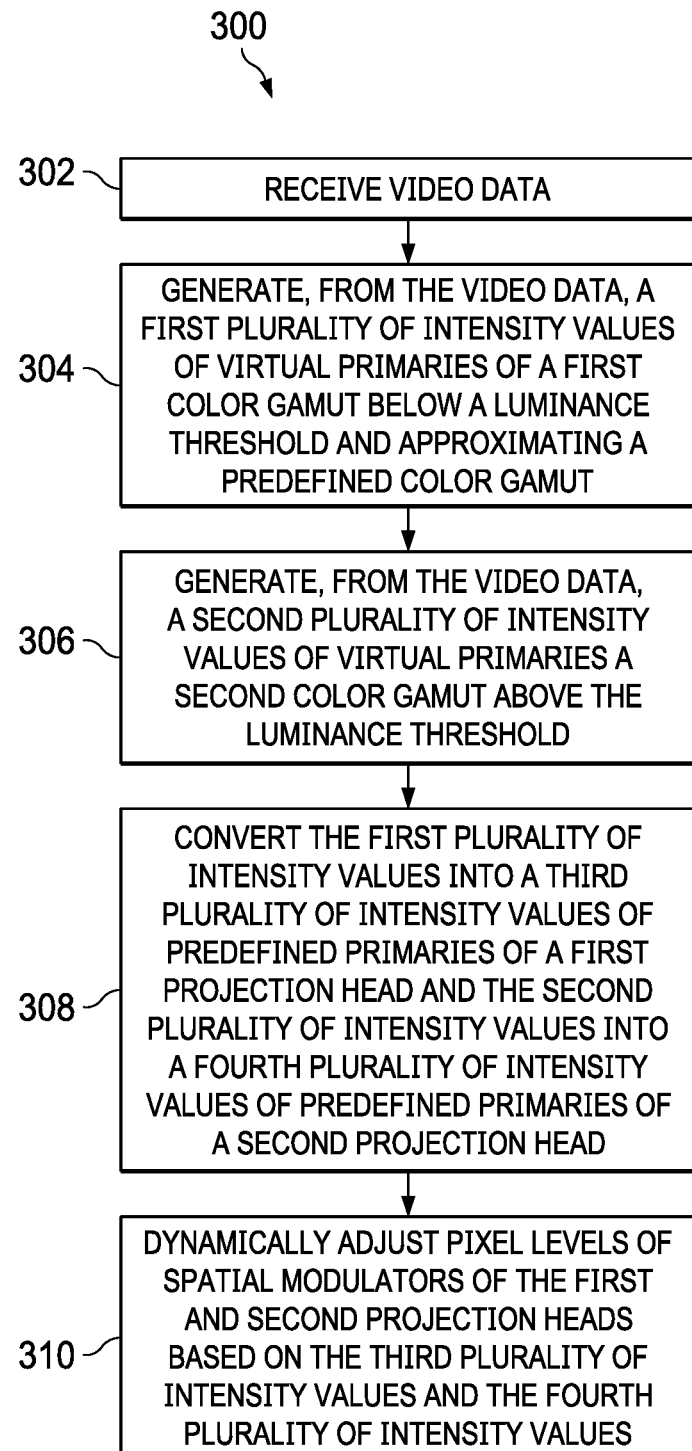

FIG. 3 is a flowchart illustrating an exemplary method implemented by the controller of FIG. 2 according to various aspects of the present disclosure.

Figure 4:
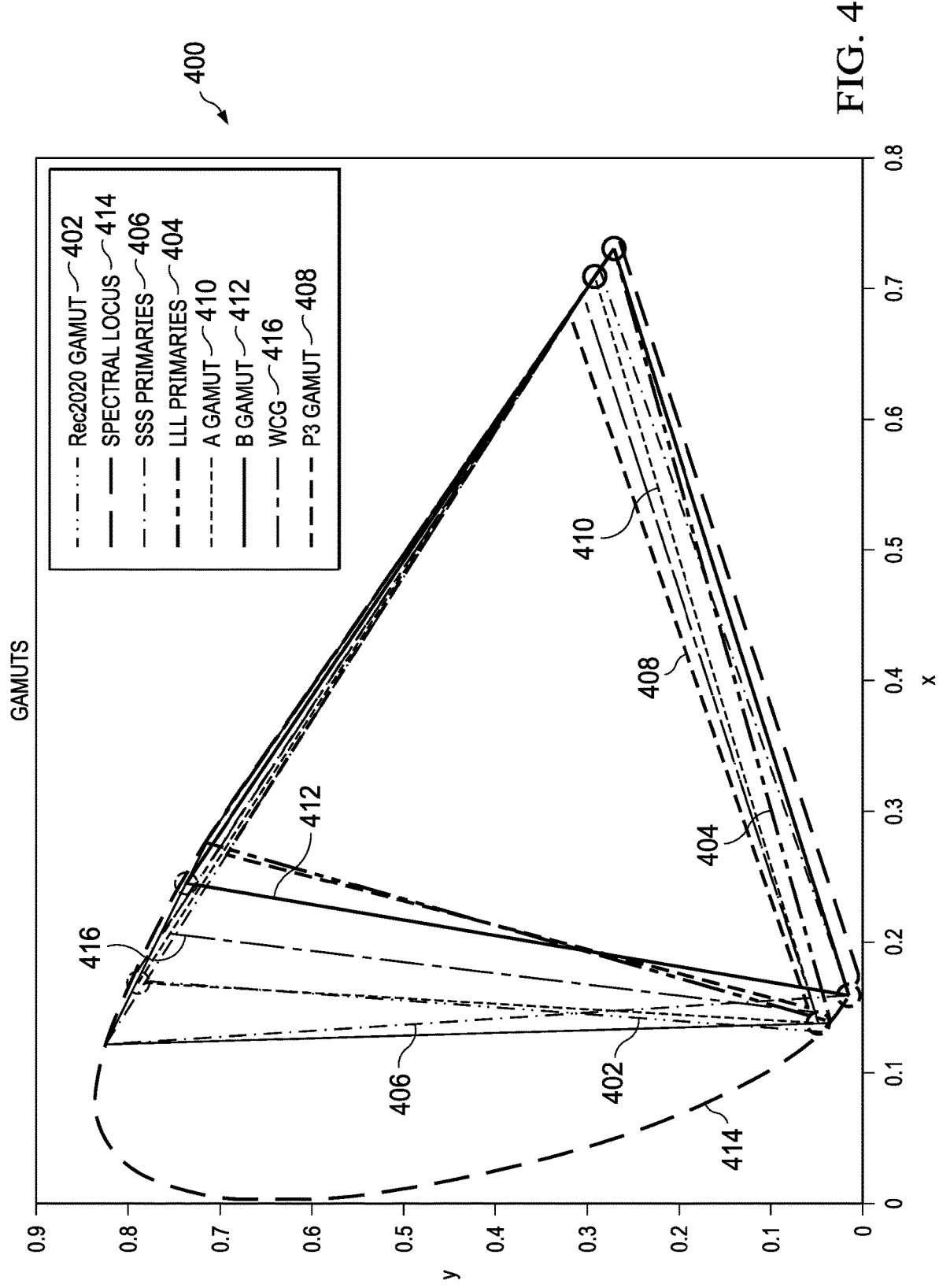

FIG. 4 is an exemplary chromaticity diagram according to various aspects of the present disclosure.

Figure 5A:
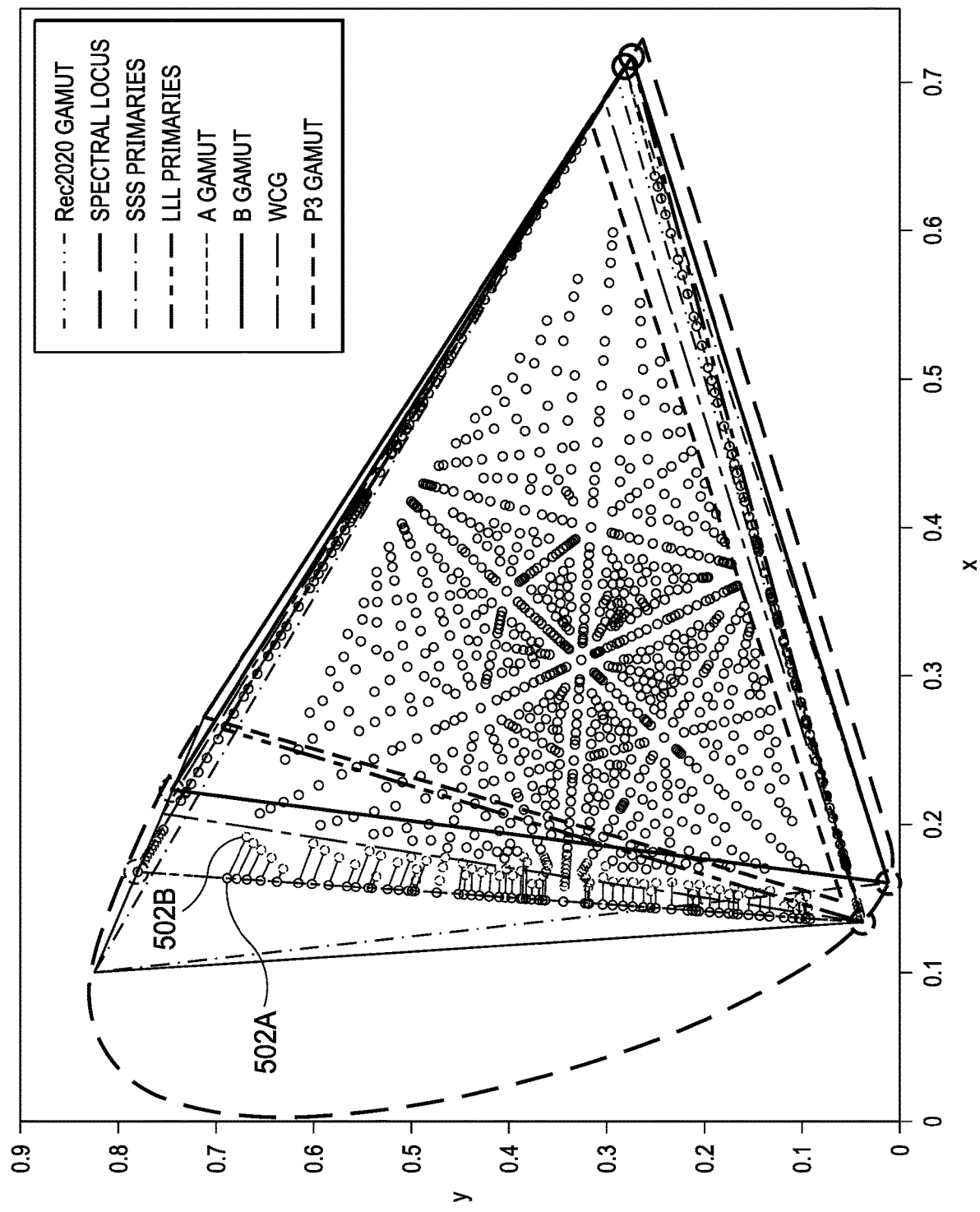

FIG. 5A is an exemplary chromaticity diagram according to various aspects of the present disclosure.

Figure 5B:
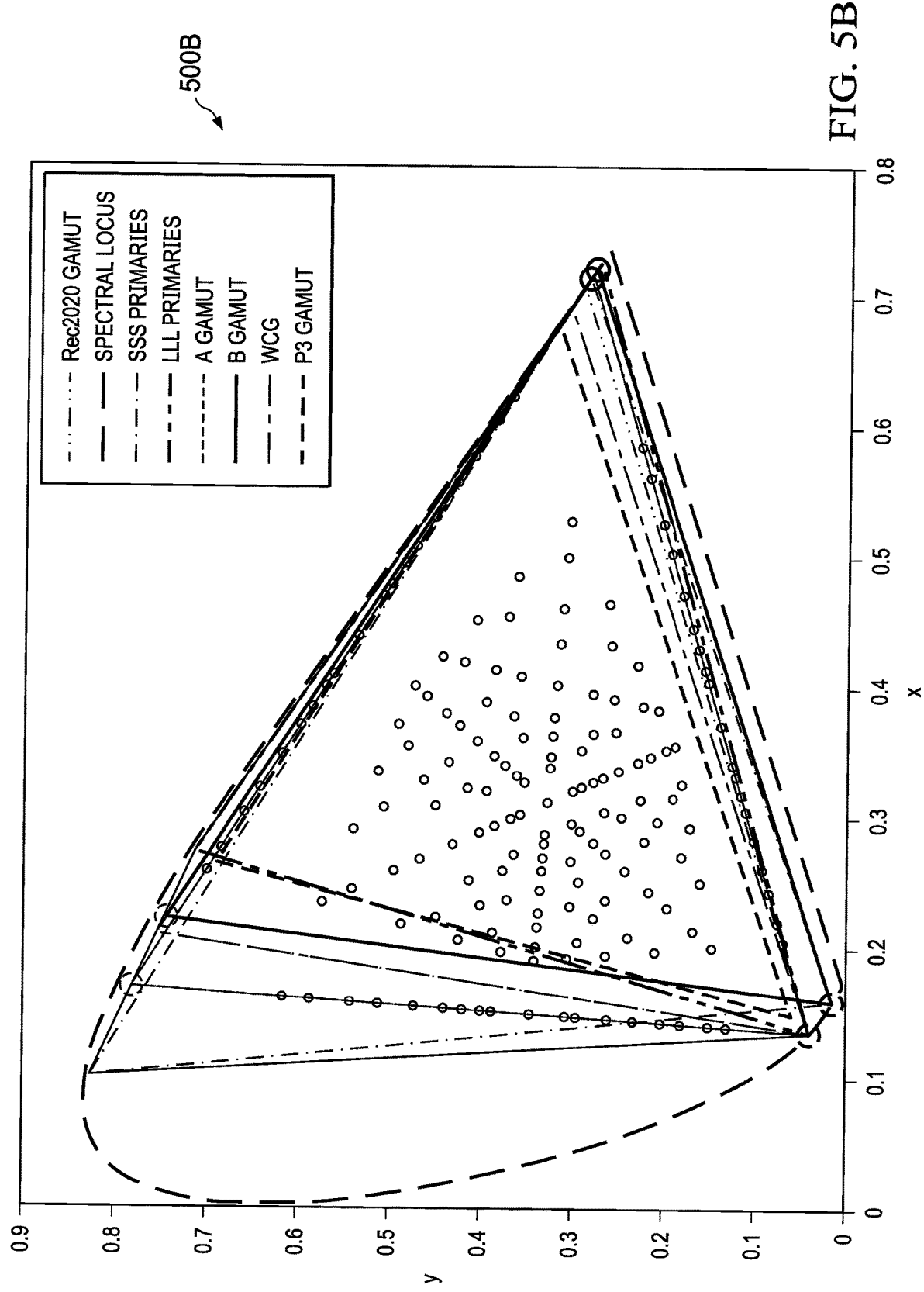

FIG. 5B is an exemplary chromaticity diagram according to various aspects of the present disclosure.

Figure 6A:
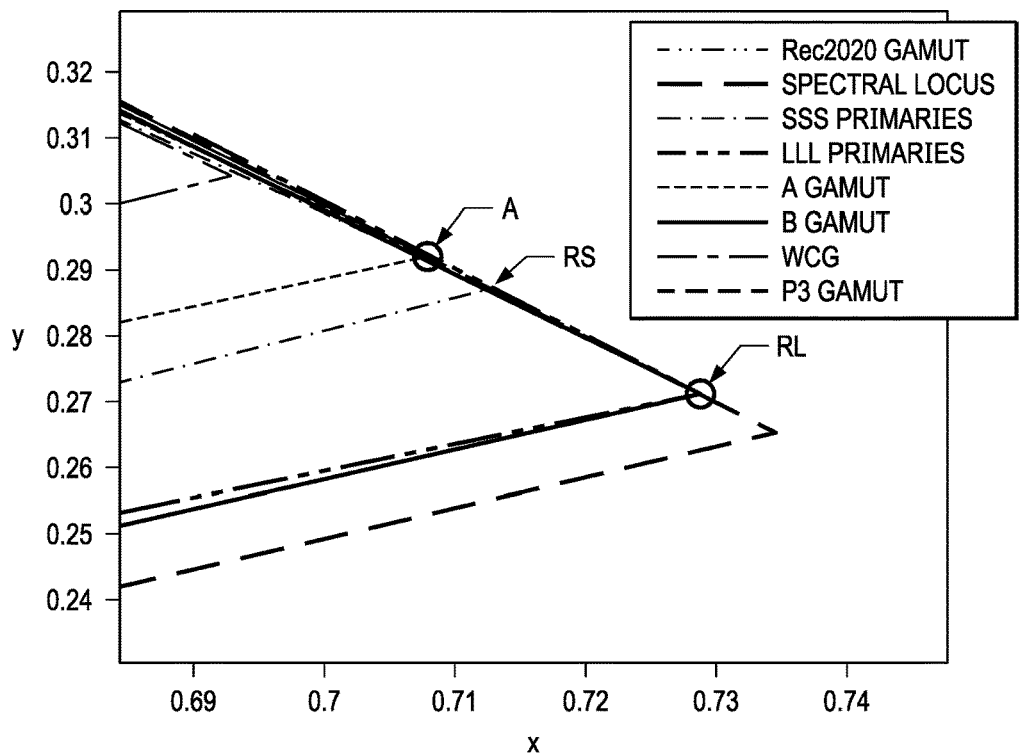

FIG. 6A is an exemplary chromaticity diagram according to various aspects of the present disclosure.

Figure 6B:
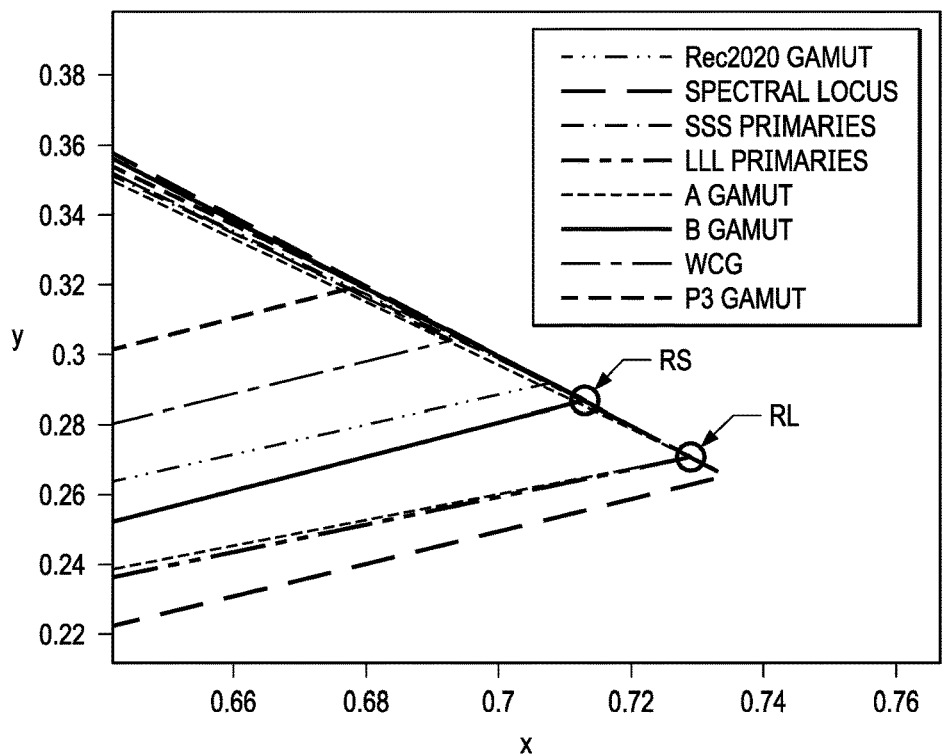

FIG. 6B is an exemplary chromaticity diagram according to various aspects of the present disclosure.

Figure 7A:
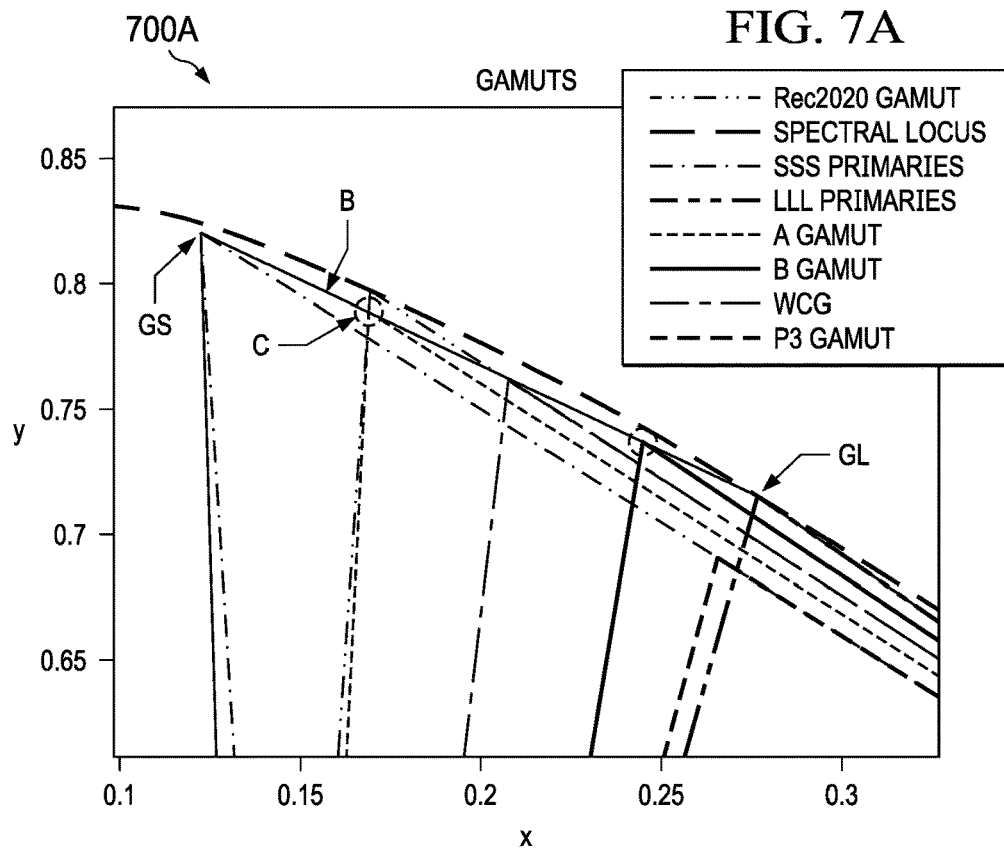

FIG. 7A is an exemplary chromaticity diagram according to various aspects of the present disclosure.

Figure 7B:
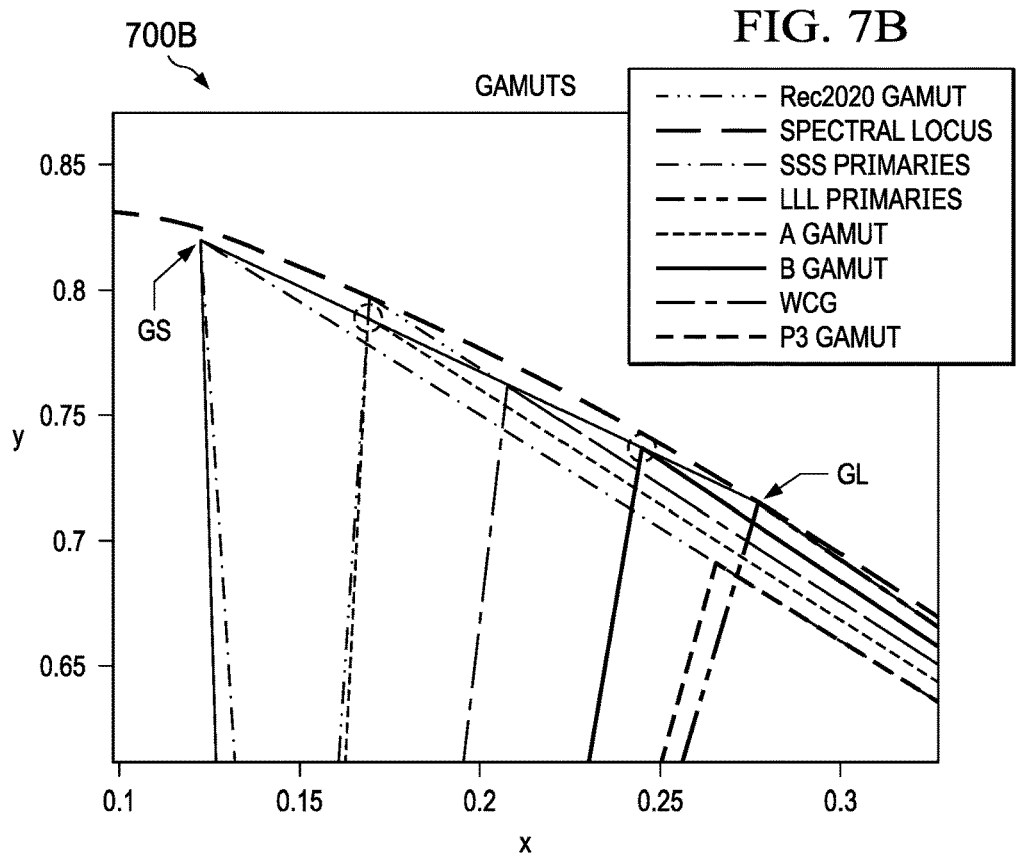

FIG. 7B is an exemplary chromaticity diagram according to various aspects of the present disclosure.

FIG. 8A is an exemplary chromaticity diagram according to various aspects of the present disclosure.

FIG. 8B is an exemplary chromaticity diagram according to various aspects of the present disclosure.

DETAILED DESCRIPTION

As noted above, some 6P displays configured to project 3D images may be utilized to project/display 2D images. When projecting 3D images, the six primaries are used to display the left-eye and right-eye images using one set of three (red, green, and blue) primaries for the left-eye image and the other set of three primaries for the right-eye image. 3D glasses for use with such a display may have corresponding filters (such as band pass filters) to allow each eye to see the appropriate image. Two-dimensional images can be displayed by 3D displays by driving each pair of primary light sources with the same data without the need to for a viewer to wear 3D glasses. For example, the 2D red data values are used to drive both the red1 and the red2 primaries. Similarly, the 2D green data values are used to drive both the green1 and the green2 primaries, and the 2D blue data values are used to drive both the blue1 and blue2 primaries. The system is calibrated with the combined primaries and images can be produced. However, the resulting color gamut can be limited significantly with respect to a desired color gamut (for example, the established Recommendation ITU-R BT.2020 (August 2012) Parameter values for ultra-high definition television systems for production and international programme exchange, henceforth referred to as Rec2020 gamut). Increasing the resulting color gamut of the 3D color volume can result in a reduction of the incidence of chromaticity errors, such as chroma clipping, and can preserve a hue when clipping pixels that do not fit within the 3D color volume.

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects of the present disclosure, and does not limit the scope of the disclosure in any way.

In the following description, numerous details are set forth, such as circuit configurations, waveform timings, circuit operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples where the received video data is of Rec2020, it will be understood that this is merely one example of an implementation and that other color spaces may be utilized. It will further be understood that the disclosed systems and methods can be used in any projection system to improve the rendering of 2D images on six primary displays.

Projector Systems

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components. For example, in some embodiments the system 100 of FIGS. 1B and 1C below includes more than one light source 102.

As described above, some 3D displays, referred to as 6P systems, simultaneously display a left eye and right eye image using two distinct sets of primaries. FIG. 1A is a spectral diagram 1 of a 6P system in accordance with some embodiments. The spectral diagram 1 includes three short wavelengths 2A, 3A, and 4A (referred to herein as short primaries) and three long wavelengths 2B, 3B, and 4B (referred to herein as long primaries). The example display systems described herein are configured to utilize the short primaries 2A, 3A, and 4A for the left eye image (for example, via a designated left projector) and the long primaries 2B, 3B, and 4B for the right eye image (for example, via a designated right projector). In other implementations, however, the short primaries 2A, 3A, and 4A may be used for the right eye image and the long primaries 2B, 3B, and 4B may be used for the left eye image. The short primaries 2A, 3A, and 4A may be, for example, a first blue wavelength, a first green wavelength, and a red blue wavelength, respectively. The long primaries 2B, 3B, and 4B may be, for example, a second blue wavelength, a second green wavelength, and a second red wavelength, respectively. The first red wavelength is shorter than the second red wavelength, the first green wavelength is shorter than the second green wavelength, and the first blue wavelength is shorter than the second blue wavelength. It should be understood that, in further embodiments, a combination of short and long primaries may be utilized for each eye image. As explained in more detail below, each projector outputs a modulated light output (of the designated primaries of the projector) onto a display or viewing screen. In the embodiments described herein, both the left eye image and the right eye image are simultaneously displayed.

FIGS. 1B and 1C are each a block diagram of exemplary display systems 100 in accordance with some embodiments. Each system includes at least some similarly configured components, which are labelled as such. The display system 100 is configured to display 3D and 2D video data received from a video data source 101. The display system 100 may be any kind of system configured to display images, for example, a projection system or a light-emitting diode (LED) display system. The display system 100 includes a light source 102, illumination optics 104, a separator 106, one or more modulators 108, a combiner 110, projection optics 112, and a controller 114. While FIGS. 1B and 1C illustrate one light source 102, display systems 100 in accordance with some embodiments may contain multiple light sources 102. The components of the system 100 may be housed in a single projection device (such as a single projector) or, in some embodiments, multiple devices. For example, in some embodiments, the light sources, the modulators, and other components of the display system 100 can be separated into two or more separate, coordinated projection devices. In such an embodiment, each of the separate, coordinated projection devices may handle one set of wavelengths. For example, a first separate, coordinated projection device may separate, modulate, and combine the short primaries 2A, 3A, and 4A, while a second separate, coordinated projection device may separate, modulate, and combine the long primaries 2B, 3B, and 4B.

The light source 102 is driven by the controller 114 to produce an illumination beam including, in the illustrated embodiment, six primary colors. The illumination beam is directed through illumination optics 104 and into color separator 106. The color separator 106 separates the illumination beam into the six primary beams and directs each primary beam to an associated one of spatial light modulators (SLMs) 108. Each modulator 108 modulates the primary illumination beams based on input from the controller 114, as described in more detail below. The projection optics 112 focus the modulated beam to form an imaging beam 116. The imaging beam 116 is then projected to create an image, for example, onto a viewing surface (not shown). In the exemplary system of FIG. 1B, the left- and right-eye images may be alternatingly projected (also called "time divisional multiplexing").

In some embodiments, each primary color may be associated with an individual modulator 108. Alternatively, as shown in FIG. 1B, the number of modulators may be reduced, for example by using a field sequential modulation scheme. In some embodiments, the modulators can include a plurality of modulators for each primary color, as, for example, in a dual modulation projector. In some embodiments, each modulator 108 is associated with a set of primary colors. For example, as described above in regard to FIG. 1A, a 6P system, as shown in FIG. 1C, may include a left projector and a right projector. FIG. 1C illustrates a dual head display system 100, which includes separate modulators 108A and 108B, projection optics 112A and 112B (e.g., first projection device 112A and second projection device 112B), and two resulting imaging beams 116A and 116B, each set of which are designated for a left eye channel and a right eye channel respectively. The modulator 108A, projection optics 112A, and the resulting imaging beam 116A may be considered components of a left projector (projection head) and the modulator 108B, projection optics 112B, and the resulting imaging beam 116B may be considered components of a right projector (projection head). As described above, light outputs from both channels are shown simultaneously to produce a single resulting image on a display or screen. Furthermore, while FIGS. 1B and 1C illustrate video data source 101 as being separate from the display system 100, in some embodiments the video data source 101 may be internal to the display system 100 (for example, in a memory associated with the display system 100). In some embodiments, the separator 106, one or more modulators 108, and the combiner 110 may be duplicated serially such that a second combination of a separator 106, one or more modulators 108, and a combiner 110 are repeated prior to the projection optics 112. Additionally, methods described herein may be performed in devices that do not include the separator 106 and the combiner 110. Accordingly, such devices may provide for the illumination beams to be combined on the screen itself using multiple projectors.

FIG. 2 is a block diagram of the controller 114 in accordance with some embodiments. The controller 114 includes an electronic processor 205, a memory 210, and an input/output interface 215. The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 may include multiple cores or individual processing units. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. The memory 210 may take the form of any non-transitory computer-readable medium.

The input/output interface 215 is configured to receive input and to provide system output. The input/output interface 215 obtains information and signals from, and provides information and signals to (for example, over one or more wired and/or wireless connections) devices both internal and external to the display system 100, for example, the light source 102, the modulator(s) 108, and the video data source 101.

Image Rendering Method

FIG. 3 is a flowchart illustrating an example method 300 of operating a projection system in accordance with some embodiments. As an example, the method 300 is described as being performed by the controller 114 illustrated in FIGS. 1B and 1C and, in particular, the electronic processor 205 illustrated in FIG. 2.

At block 302, the electronic processor 205 receives video data from a video data source, such as the video data source 101 illustrated in FIGS. 1B and 1C. The video data may include a series of tristimulus pixel values from a video content stream or file. In some embodiments, the video data includes pixel values in a color space (or gamut) such as Rec2020 (also referred to as ITU-R Recommendation BT.2020). At block 304, the electronic processor 205 generates, from the video data, a first plurality of intensity values of virtual primaries of a first color gamut and, at block 306, generates, from the video data, a second plurality of intensity values of virtual primaries of a second color gamut. In particular, a gamut volume for 2D images is split into two virtual gamuts: gamut A and gamut B. Each gamut includes virtual primaries that are specific blends of the predefined primaries. As explained in more detail below, gamut A is selected to be as close to a predefined color gamut, for example a defined standard color space (for example, Rec2020), while gamut B is utilized for any residual energy from the predefined primaries. In other words, gamut A is used for lower luminance levels and gamut B is added to achieve higher luminance levels when applicable. In some implementations, gamut A is optimized to achieve the largest possible color gamut.

Returning to FIG. 3, at block 308, the electronic processor 205 converts the first plurality of intensity values into a third plurality of intensity values of predefined primaries of a first eye channel (for example, a channel of a first projection head) and the second plurality of intensity values into a fourth plurality of intensity values of predefined primaries of a second eye channel (for example, a channel of a second projection head). In some implementations, the first eye channel and the second eye channel are separate channels of the same projection head or projection device.

In some embodiments, a blending function is applied to gamut A and gamut B to optimize each gamut to be close to the color space of the video data (in the present example, Rec2020). In other words, in these embodiments, the electronic processor 205 converts, e.g. via one or more blending function, the first plurality of intensity values and the second plurality of intensity values into a third plurality of intensity values of predefined primaries of a first eye channel (for example, a channel of a first projection head). The electronic processor 205 also converts, e.g. via one or more blending function, the first plurality of intensity values and the second plurality of intensity values into a fourth plurality of intensity values of predefined primaries of a second eye channel (for example, a channel of a second projection head). Equations [1] and [2] below illustrate the blending function performed at block 308 for the left eye channel and the right eye channel respectively.

$$\begin{bmatrix} R_L \\ G_L \\ B_L \end{bmatrix} = [B_{AL}] \begin{bmatrix} R_A \\ G_A \\ B_A \end{bmatrix} + [B_{BL}] \begin{bmatrix} R_B \\ G_B \\ B_B \end{bmatrix} \quad [1]$$

and $$\begin{bmatrix} R_S \\ G_S \\ B_S \end{bmatrix} = [B_{AS}] \begin{bmatrix} R_A \\ G_A \\ B_A \end{bmatrix} + [B_{BS}] \begin{bmatrix} R_B \\ G_B \\ B_B \end{bmatrix} \quad [2]$$

The vector of $R_L$ $G_L$ $B_L$ corresponds to the third plurality of intensity values, e.g. primaries of the right eye channel, and the vector of $R_S$ $G_S$ $B_S$ corresponds to the fourth plurality of intensity values, e.g. primaries of the left eye channel, in which R refers to a red primary, G refers to a green primary, B refers to a blue primary, the subscript L refers to "long" wavelength primaries, and the subscript S refers to "short" wavelength primaries. In some embodiments, the right eye channel may include the short wavelength primaries while the left eye channel includes the long wavelength primaries. In both equations, gamut A (the matrix including $R_A$ $G_A$ $B_A$) and gamut B (the matrix including $R_B$ $G_B$ $B_B$) of each channel is scaled by a blend matrix (the matrices of $B_{AL}$, $B_{BL}$, $B_{AS}$, and $B_{BS}$). The particular values of the blend matrices may be predetermined values determined based on the location of the primaries and the predetermined color space. The particular values may also be dependent on the projection/display system used (for example, the type of projector head). Example methods of determination of each blend matrices are described in more detail below. In the present example, the following blend matrices values are used.

$$[B_{AL}] = \begin{bmatrix} 0 & 0 & 0 \\ 0.0096 & 0.2626 & 0 \\ 0 & 0 & 0.9733 \end{bmatrix}$$

$$[B_{BL}] = \begin{bmatrix} 1.0000 & 0 & 0 \\ 0 & 0.7278 & 0 \\ 0 & 0 & 0.0267 \end{bmatrix}$$

$$[B_{AS}] = \begin{bmatrix} 0.9904 & 0 & 0 \\ 0 & 0.7374 & 0.0267 \\ 0 & 0 & 0 \end{bmatrix}$$

$$[B_{AL}] = \begin{bmatrix} 0.0096 & 0 & 0 \\ 0 & 0.2359 & 0 \\ 0 & 0 & 1.0000 \end{bmatrix}$$

Returning to FIG. 3, at block 310, the electronic processor 205 dynamically adjusts pixel levels of at least one spatial modulator, such as the modulator 108 illustrated in FIGS. 1B and C, based on the third plurality of intensity values and the fourth plurality of intensity values. In embodiments where the system 100 is a dual head projection system, pixel levels of the modulator of each of the projection heads are adjusted.

As mentioned above, gamut A is optimized to be as close to a predefined color gamut, for example a defined standard color space (for example, Rec2020), while gamut B is utilized for any residual energy from the predefined primaries. Below two exemplary methods implemented by the processor 205 to process received video data into gamuts A and B are described.

One method to optimize gamut A is by scaling (for example, compressing) the chromaticities of the video data to fit within the achievable gamut volume of the light source 102, referred to herein as gamut scaling. In the gamut scaling method, two functions are defined:

$$f_l(P) = \text{if}(P<0.5), P, \text{ else } 0.5$$

$$f_u(P) = P - f_l(P)$$

$$P \in R_{2020}, G_{2020}, B_{2020}$$

The variable P represents the pixel values of the received video data, which is here assumed to be tristimulus Rec2020 data. The function $f_l(P)$ represents a lookup table for gamut A while the function $f_u(P)$ represents a lookup table for gamut B. In the present example, the function $f_l(P)$ defines a linear ramp increasing from 0 to 0.5 and flat-lining beyond 0.5 while the function $f_u(P)$ defines a flat line from 0 to 0.5 and a linear ramp increasing from 0.5. The value 0.5 corresponds to a luminance threshold. In some embodiments, a different luminance threshold may be used.

For each of the pixel values of the received video data, gamut A and gamut B are derived as follows:

$$\begin{bmatrix} R_A \\ G_A \\ B_A \end{bmatrix} = \begin{bmatrix} f_l(R_{2020}) \\ f_l(G_{2020}) \\ f_l(B_{2020}) \end{bmatrix}$$

$$\begin{bmatrix} R_B \\ G_B \\ B_B \end{bmatrix} = \begin{bmatrix} f_u(R_{2020}) \\ f_u(G_{2020}) \\ f_u(B_{2020}) \end{bmatrix}$$

In other words, for each primary channel of the incoming video data $R_{2020}$, $G_{2020}$, and $B_{2020}$, the pixel values with a luminance level under 0.5 (corresponding to 50% of the total luminance range of the system 100 and 100% of the luminance range of gamut A) are included within gamut A while the pixel values that exceed 0.5 (meaning that they are outside of the luminance range of gamut A) are allocated to gamut B. The derived gamut A and gamut B signals are then converted to the defined primaries as described above in regard to block 308 and Equations [1] and [2] above.

Another method to process received video data into gamut A is by clipping chromaticities to fit within gamuts A and B to fit within the achievable gamut volume of the light source 102. First, the transformation relationship $[C]_A$ and $[C]_B$ from the color space of the source 102 to gamut A and gamut B, respectively, is defined. The derivation may be performed as follows.

Knowing the normalized primary matrices for the left channel and right channel, arbitrary points in both channels may be defined as:

$$\begin{bmatrix} X \\ Y \\ Z \end{bmatrix} = [NPM]_{LLL}\begin{bmatrix} R_L \\ G_L \\ B_L \end{bmatrix} + [NPM]_{SSS}\begin{bmatrix} R_S \\ G_S \\ B_S \end{bmatrix}$$

Where the vector of X, Y, and Z corresponds to an arbitrary point, the matrices of $NPM_{LLL}$ and $NPM_{SSS}$ correspond to the normalized primary matrices of the right eye channel and the left eye channel respectively, and the matrices of $R_L$, $G_L$, and $B_L$ and $R_S$, $G_S$, and $B_S$ correspond to non-normalized matrices of the right eye channel and the left eye channel respectively The blending functions defined in Equations [1] and [2] above are each substituted in as the non-normalized matrices of the right eye channel and the left eye channel respectively.

$$\begin{bmatrix} X \\ Y \\ Z \end{bmatrix} = [NPM]_{LLL}\left\{[B_{AL}]\begin{bmatrix} R_A \\ G_A \\ B_A \end{bmatrix} + [B_{BL}]\begin{bmatrix} R_B \\ G_B \\ B_B \end{bmatrix}\right\} + [NPM]_{SSS}\left\{[B_{AS}]\begin{bmatrix} R_A \\ G_A \\ B_A \end{bmatrix} + [B_{BS}]\begin{bmatrix} R_B \\ G_B \\ B_B \end{bmatrix}\right\}$$

Converting the above formula into terms of primary matrices, the formula becomes:

$$\begin{bmatrix} X \\ Y \\ Z \end{bmatrix} = [PM]_A\begin{bmatrix} R_A \\ G_A \\ B_A \end{bmatrix} + [PM]_B\begin{bmatrix} R_B \\ G_B \\ B_B \end{bmatrix}$$

wherein $[PM]_A = [NPM]_{LLL}[B_{AL}] + [NPM]_{SSS}[B_{AS}]$ and $[PM]_B = [NPM]_{SSS}[B_{BS}] + [NPM]_{LLL}[B_{BL}]$ Knowing the normalized primary matrix for Rec2020 below:
$[NPM]_{2020}$
The transformation from the source Rec2020 vectors to gamuts A and B are respectively:

$$\begin{bmatrix} R \\ G \\ B \end{bmatrix}_A = [C]_A\begin{bmatrix} R \\ G \\ B \end{bmatrix}_{2020} \quad \text{where } [C]_A = [PM]_A^{-1}[NPM]_{2020}$$

and $$\begin{bmatrix} R \\ G \\ B \end{bmatrix}_B = [C]_B\begin{bmatrix} R \\ G \\ B \end{bmatrix}_{2020} \quad \text{where } [C]_B = [PM]_B^{-1}[NPM]_{2020}$$

As mentioned above, gamut A is used for lower luminance levels while gamut B is utilized where applicable to achieve higher luminance levels. In contrast to the gamut scaling method, where the luminance range of gamut A is the same across all channels, here a threshold vector is utilized as the luminance threshold, meaning that the luminance range of gamut A varies per channel. The threshold vector representing the transition between the 'A' and 'B' gamuts in Rec2020 space can be found as follows:

$$\begin{bmatrix} T_R \\ T_G \\ T_B \end{bmatrix}_{2020} = [C]_A^{-1}\begin{bmatrix} 0.5 \\ 0.5 \\ 0.5 \end{bmatrix}$$

In other words, each threshold in the threshold vector is determined based on a transform of the first virtual color gamut to the predefined color gamut. The following functions are then defined:

$f_l(P) = \text{if}(P < T_P), P, \text{else } T_P$ $f_u(P) = P - f_l(P)$ $P \in R_{2020}, G_{2020}, B_{2020}$ The variable P represents the pixel values of the received video data, which is here assumed to be tristimulus Rec2020 data. Similar to the functions $f_l(P)$ and $f_u(P)$ of the gamut scaling method described above, the function $f_l(P)$ again represents a lookup table for gamut A while the function $f_u(P)$ represents a lookup table for gamut B. In the present example, the function $f_l(P)$ defines a linear ramp increasing from 0 to the threshold value of the particular channel as defined in the threshold vector and flat-lining beyond the particular threshold value while the function $f_u(P)$ defines a flat line from 0 to the particular threshold value and a linear ramp increasing from the particular threshold value. Again, here the particular threshold values respectively correspond to a luminance threshold of each of the channels of gamut A. In some embodiments, the functions $f_l(P)$ and $f_u(P)$ may define transitions other than the linear ramps described above (so long as the sum of the functions is equal to 1). For example, either or both functions $f_l(P)$ and $f_u(P)$ may define a curve to the flat line.

For each of the pixel values of the received video data, gamut A and gamut B are derived as follows:

$$\begin{bmatrix} R_A \\ G_A \\ B_A \end{bmatrix} = \begin{bmatrix} f_l(R_{2020}) \\ f_l(G_{2020}) \\ f_l(B_{2020}) \end{bmatrix}$$

$$\begin{bmatrix} R_B \\ G_B \\ B_B \end{bmatrix} = \begin{bmatrix} f_u(R_{2020}) \\ f_u(G_{2020}) \\ f_u(B_{2020}) \end{bmatrix}$$

In other words, for each primary channel of the incoming video data $R_{2020}$, $G_{2020}$, and $B_{2020}$, the pixel values with a luminance level under the corresponding threshold value of the threshold vector $T_R$, $T_G$, and $T_B$ (corresponding to a specific luminance range of gamut A) are included within gamut A while the pixel values that exceed the particular threshold value (meaning that they are outside of the luminance range of gamut A) are allocated to gamut B.

Any intensity values of the derived gamut A and gamut B that are negative values are then clipped to 0, as shown in the following equations [3] and [4].

$$\begin{bmatrix} R_A \\ G_A \\ B_A \end{bmatrix} = \begin{bmatrix} \max(R_A, 0) \\ \max(G_A, 0) \\ \max(B_A, 0) \end{bmatrix} \quad [3]$$

$$\begin{bmatrix} R_B \\ G_B \\ B_B \end{bmatrix} = \begin{bmatrix} \max(R_B, 0) \\ \max(G_B, 0) \\ \max(B_B, 0) \end{bmatrix} \quad [4]$$

In some implementations, the negative values are clipped to 1 (or white) rather than 0. The derived gamut A and gamut B signals are then converted to the defined primaries as described above in regard to block 308 and equations [1] and [2] above.

In another implementation, gamut scaling is achieved using the following functions:

$$f_u(P) = P - T_{2020}$$

$$P \in R_{2020}, G_{2020}, B_{2020}$$

In the present example, the variable P represents the pixel values of the received video data, which is here assumed to be tristimulus Rec 2020 data. The function $f_u(P)$ calculates the upper gamut influence on clipping behavior of the system and defines a linear ramp increasing in the positive direction from the threshold value of the particular channel as defined in the threshold vector and decreasing in the negative direction from the same threshold value.

The A gamut may be adjusted based on a residual of the B gamut. For example, the B gamut is derived as follows:

$$\begin{bmatrix} R_{Bf} \\ G_{Bf} \\ B_{Bf} \end{bmatrix} = [C]_{B+} \begin{bmatrix} f_u(R_{2020}) \\ f_u(G_{2020}) \\ f_u(B_{2020}) \end{bmatrix}$$

where $$[C]_{B+} = \max(0, [C]_B)$$

The resulting B gamut includes a plurality of positive pixel values and a plurality of negative pixel values. The plurality of negative pixel values are set to predetermined values (i.e., clipped) to obtain a residual of the B gamut, derived as follows:

$$\begin{bmatrix} R_B \\ G_B \\ B_B \end{bmatrix} = \begin{bmatrix} \min[L_R, \max(R_{Bf}, 0)] \\ \min[L_G, \max(R_{Bf}, 0)] \\ \min[L_B, \max(R_{Bf}, 0)] \end{bmatrix}$$

where $$L_R, L_G, L_B \in [0, 1]$$

In other words, any intensity values of the derived gamut B that are negative values are first clipped to 0. Then, any respective intensity value of the derived gamut B is set to the minimum of either (1) the intensity value following the clipping action, or (2) a predetermined threshold value L. The predetermined threshold value may be any value between 0 and 1, such as 0.5. As one example, if the predetermined threshold is 0.5, any intensity value above 0.5 if set to 0.5, and any intensity value below 0.5 remains the same value.

The clipped gamut B intensity values are then converted back to the defined standard color space (e.g., Rec2020) and subtracted from the initial video data, as defined below:

$$\begin{bmatrix} R_{2020} \\ G_{2020} \\ B_{2020} \end{bmatrix}_{Remainder} = \begin{bmatrix} R_{2020} \\ G_{2020} \\ B_{2020} \end{bmatrix} - [C]_B^{-1} \begin{bmatrix} R_B \\ G_B \\ B_B \end{bmatrix}$$

Where $R_{2020}$, $G_{2020}$, and $B_{2020}$ are the R, G, B values of the video data in the defined standard color space.

The gamut A is then processed based on the remaining video data within the defined standard color space:

$$\begin{bmatrix} R_{Af} \\ G_{Af} \\ B_{Af} \end{bmatrix} = [C]_A \begin{bmatrix} R_{2020} \\ G_{2020} \\ B_{2020} \end{bmatrix}_{Remainder}$$

Maximized pixel values are then added to the gamut A to add white color and bring any negative intensity values back into the respective gamut, while maintaining the achieved hue. In some implementations, rather than clipping any intensity values of the derived gamut B that are negative values to 0, maximized pixel values may be added to the gamut B to add white color. The source white point may be calculated in the gamut A according to the following:

$$\begin{bmatrix} R_{A\_WP} \\ G_{A\_WP} \\ B_{A\_WP} \end{bmatrix} = [C]_A \begin{bmatrix} 1.0 \\ 1.0 \\ 1.0 \end{bmatrix}_{2020}$$

$$\begin{bmatrix} R_{A\_WP\_RECIP} \\ G_{A\_WP\_RECIP} \\ B_{A\_WP\_RECIP} \end{bmatrix} = \begin{bmatrix} 1/R_{A\_WP} \\ 1/G_{A\_WP} \\ 1/B_{A\_WP} \end{bmatrix}$$

The minimum amount by which the white-point vector must be scaled such that when added to the pixel it clears all the negative intensity values is found:

$$\text{Clip}_A = \min(R_{Af} B_{A\_WP\_RECIP}, G_A G_{A\_WP\_RECIP}, B_{Af} B_{A\_WP\_RECIP}, 0)$$

The white-point vector is scaled by this amount such that the lowest-value component of the gamut A is zero.

$$\begin{bmatrix} R_A \\ G_A \\ B_A \end{bmatrix} = \begin{bmatrix} R_{Af} \\ G_{Af} \\ B_{Af} \end{bmatrix} - \text{Clip}_A \begin{bmatrix} R_{A\_WP} \\ G_{A\_WP} \\ B_{A\_WP} \end{bmatrix}$$

Equation [1] and Equation [2] above are used to calculate the drive values of the first projection device 112A and the second projection device 112B, respectively. These drive values define an output gamut of the projector system.

The gamut clipping method clips colors to the edge of gamuts A and B which can be created approximately the same for any projector system. In other words, colors produced by one projector may be faithfully reproduced by any other kind of projector, regardless of whether or not the source primaries are the same.

Alternatively, the blend function may be applied to gamuts A and B before clipping the negative values. By applying the blending function to each gamut, the values of each gamut are converted to be in terms of the predefined primaries of the color space of the received video data. The clipping may then be applied as shown below.

$$\begin{bmatrix} R_L \\ G_L \\ B_L \end{bmatrix} = \begin{bmatrix} \max(R_L, 0) \\ \max(G_L, 0) \\ \max(B_L, 0) \end{bmatrix}$$

$$\begin{bmatrix} R_S \\ G_S \\ B_S \end{bmatrix} = \begin{bmatrix} \max(R_S, 0) \\ \max(G_S, 0) \\ \max(B_S, 0) \end{bmatrix}$$

This method maximizes the gamut coverage for the particular primaries of any projector system.

The output gamut primarily uses three primaries at low brightness and six primaries at a higher brightness. However, such a system may be prone to metameric failure, in which an observer perceives colors differently based on the brightness. For example, as more of the gamut B is blended, the shape of the spectrum output by the projection system is altered. This may be mitigated by using six primaries as much as possible and limiting the use of three primaries for a subset of the target gamut. In some implementations, this is achieved by blending the output gamut with a native gamut of the projection system. The native gamut may be a gamut unique to the projector system and based on the specific configuration of the projection system. Accordingly, it may vary between projectors. The native gamut is defined as a set of three primaries Rc, Gc, Bc that drives both long and short primaries equally. For example:

$$\begin{bmatrix} X \\ Y \\ Z \end{bmatrix} = \left( [NPM]_{LLL} \begin{bmatrix} R_C \\ G_C \\ B_C \end{bmatrix} + [NPM]_{SSS} \begin{bmatrix} R_C \\ G_C \\ B_C \end{bmatrix} \right) * 0.5$$

The primary matrix of the gamut C is defined as:

$$[PM]_C = \frac{[NPM]_{LLL} + [NPM]_{SSS}}{2}$$

In some implementations, $[B_{AL}]+[B_{AS}]=I_3$ and $[B_{BL}]+[B_{BS}]=I_3$, and $[PM]_C$ can be defined as:

$$[PM]_C = \frac{[PM]_A + [PM]_B}{2}$$

where $$I_3 = \begin{bmatrix} 1 & 0 & 0 \\ 0 & 1 & 0 \\ 0 & 0 & 1 \end{bmatrix}$$

To transform from the defined standard color space (e.g., Rec2020) vector to the gamut C:

$$\begin{bmatrix} R \\ G \\ B \end{bmatrix}_C = [C]_C \begin{bmatrix} R \\ G \\ B \end{bmatrix}_{2020}$$

where $$[C]_C = [PM]_C^{-1}[NPM]_{2020}$$

The native drive values supplied to the first projection device 112A and the second projection device 112B are determined by:

$$\begin{bmatrix} R_{Cf} \\ G_{Cf} \\ B_{Cf} \end{bmatrix} = [C]_C \begin{bmatrix} R_{2020} \\ G_{2020} \\ B_{2020} \end{bmatrix}$$

Similar to the gamuts A and B, white may be added to the native drive values to return any negative intensity values back into the gamut C while maintaining a hue of the video data according to:

$$\begin{bmatrix} R_C \\ G_C \\ B_C \end{bmatrix} = \begin{bmatrix} R_{Cf} \\ G_{Cf} \\ B_{Cf} \end{bmatrix} - Clip_C \begin{bmatrix} R_{C\_WP} \\ G_{C\_WP} \\ B_{C\_WP} \end{bmatrix}$$

There may be instances in which the long, short, and native gamuts (L, S, and C gamuts) share the same white point (e.g., D65). In these instances, the white point and reciprocal of the white point are both equal to [1, 1, 1], and the calculations of adding white to the native drive values reduces to:

$$\begin{bmatrix} R_C \\ G_C \\ B_C \end{bmatrix} = \begin{bmatrix} R_{Cf} \\ G_{Cf} \\ B_{Cf} \end{bmatrix} - \min(R_{Cf}, G_{Cf}, B_{Cf}, 0) \begin{bmatrix} 1 \\ 1 \\ 1 \end{bmatrix}$$

The output drive values and the native drive values may be blended according to a blend function b: $\mathbb{R}^3 \to [0,1]$ that returns a scalar value in [0,1] based on some quality of the defined standard color space. For example, b may have the form:

$b=h(g(P))$, where $P \in R_{2020}, G_{2020}, B_{2020}$ g: $\mathbb{R}^3 \to \mathbb{R}$ is a "quality" function, and
h: $\mathbb{R} \to [0,1]$ is a "signal transfer function"
An example b function is provided below:

$$b(P) = \min\left(1, \max\left(0, \frac{sat(P) - l}{h - l}\right)\right), \text{ where } sat(P) = \frac{\max(P) - \min(P)}{\max(P)}$$

is an intensity value saturation function, $$\begin{cases} l, h \in [0, 1] \\ l < h \end{cases}$$

are the control points of the linear signal transfer function

Accordingly, the final drive values for a blending of the output color gamut and the native color gamut are:

$$\begin{bmatrix} R_L \\ G_L \\ B_L \end{bmatrix} = b(P) * \begin{bmatrix} R_L \\ G_L \\ B_L \end{bmatrix}_{OutputGamut} + (1 - b(P)) * 0.5 * \begin{bmatrix} R_C \\ G_C \\ B_C \end{bmatrix}$$

$$\begin{bmatrix} R_S \\ G_S \\ B_S \end{bmatrix} = b(P) * \begin{bmatrix} R_S \\ G_S \\ B_S \end{bmatrix}_{OutputGamut} + (1 - b(P)) * 0.5 * \begin{bmatrix} R_C \\ G_C \\ B_C \end{bmatrix}$$

In another implementation, the output gamut and the native gamut are blended directly during computation of the output gamut. For example, if $[B_{AL}]+[B_{AS}]=I_3$ and $[B_{BL}]+[B_{BS}]=I_3$ (e.g., maximal light is utilized), then:

$$[PM]_C = \frac{[PM]_A + [PM]_B}{2} = \frac{[NPM]_{LLL} + [NPM]_{SSS}}{2}$$

Hence, driving the gamuts A and B equally is equivalent to driving the long and short gamuts equally. The defined standard color space may be split equally between the gamuts A and B by redefining the functions $f_l(P)$ and $f_u(P)$ accordingly:

$$f_l(P) = \text{if } g(P) < T_{2020}, g(P), \text{else } T_{2020}$$

$$f_u(P) = P - f_l(P), \text{ where}$$

$$P \in R_{2020}, G_{2020}, B_{2020}$$

$$g(P) = P * (1 + b(P)) * 0.5$$

$$b(P) = \min\left(1, \max\left(0, \frac{sat(P) - l}{h - l}\right)\right)$$

FIG. 4 illustrates a chromaticity diagram 400. The chart 400 includes color gamuts associated with the display system 100 and the target color gamut (here, Rec2020). Gamut 402 is the Rec2020 gamut. Gamut 404 is the gamut defined by the (long) primaries $R_L$, $G_L$, and $B_L$ of the right eye channel (the LLL primaries) while gamut 406 is the gamut defined by the (short) primaries $R_S$, $G_S$, and $B_S$ of the left eye channel (the SSS primaries). Gamut 416 is the gamut defined by driving the primaries of both the right eye and left eye channels with the same values (the "WCG" gamut). As illustrated, gamut 408 differs significantly from the Rec2020 gamut 402. Gamut 410 is the virtual color gamut A and gamut 412 is the virtual color gamut B. As described above, gamut A is defined as a combination of virtual primaries to approximate the Rec2020 gamut 402 as close as possible while gamut B is defined by the remaining energy output of the virtual primaries after the energy utilized for gamut A has been subtracted. As shown, gamut A (gamut 410) matches the Rec2020 gamut 402 more closely as compared to the summation gamut 408.

FIG. 5A illustrates a chromaticity diagram 500A including the gamuts 402, 404, 406, 408, 410, and 412 described above in regard to FIG. 4. The chromaticity diagram 500A includes the input chromaticity (chromaticities marked in black) and the resulting output chromaticity (grey) achieved using the gamut clipping method described above. Lines connecting any input chromaticity point to an output chromaticity point (for example, the line connecting input point 502A to output point 502B) indicate how the input color was altered (if needed to be). Note, in the illustrated chart 500A, the maximum input is greater than the luminance threshold and thus gamut B is not utilized and that the second clipping method described above was used.

FIG. 5B illustrates a chromaticity diagram 500B including the gamuts 402, 404, 406, 408, 410, and 412 described above in regard to FIG. 4. The chromaticity diagram 500B includes the input chromaticity (black) and the resulting output chromaticity (grey) achieved using the gamut clipping method described above. In the illustrated chart 500B, the maximum input is less than the luminance threshold and thus gamut B is utilized.

As mentioned above, the blending matrices are derived values determined based on the location of the primary compared to Rec2020. The blend matrixes in particular are defined so as to place the short and long primaries of the right and left eye channels respectively at a particular desired location. Example methods to determine the blending matrices for each primary are described below.

FIG. 6A illustrates an enhanced view 600A of the chromaticity diagram 400 of FIG. 4. As shown in the view 600A, both the short red primary RS and the long red primary RL are outside of the Rec2020 color gamut 402. One may thus bring gamut A within the Rec2020 color gamut 402. To determine the blend matrix for the red primary R, one method is to bind the primary to the Rec2020 gamut. This may be done by mixing the short red wavelength (RS) with the long green wavelength for gamut A and by mixing the short red wavelength with the long red wavelength (RL) for the B gamut. The distance between the long and short red wavelengths and the Rec2020 boundary is minimized by finding the point of minimum distance between the resulting chromaticity and the Rec2020 boundary or a point of intersection. This location is then used to define the blend matrices. For example, the line of the enhanced view 600A represents the mixture of the long red and short green wavelengths. The dot A represents where the mixture intersects with the Rec2020 gamut.

Another method is, in order to not be bound to the Rec2020 gamut, to maximize the coverage of the resulting gamut. FIG. 6B illustrates an enhanced view 600B of the chromaticity diagram 400 of FIG. 4. Here, the point of longest distance from a line between the blue and green primaries of the Rec2020 gamut to the mixture of the long red (RL) and short red (RS) wavelengths. This resulted in using the long red for gamut A and the short red for gamut B.

FIG. 7A illustrates an enhanced view 700A of the chromaticity diagram 400 of FIG. 4. As shown in the view 700A, both the short green primary GS and the long green primary GL surround the Rec2020 color gamut 402. Again, one may thus bring gamut A within the Rec2020 color gamut 402. Here, the primaries are bound to the Rec2020 gamut 402 by defining an intersection point of a line B between the two green primaries with the Rec2020 boundary. This location is then used to define the blend matrices. The green dot C illustrates the point at which the gamut A green primary lies.

Another method is, in order to not be bound to the Rec2020 gamut, to maximize the coverage of the resulting gamut. FIG. 7B illustrates an enhanced view 700B of the chromaticity diagram 400 of FIG. 4. Here, the point of longest distance from a line between the red and blue primaries of the Rec2020 gamut to the mixture of the long green (GL) and short green (GS) wavelengths. This resulted in using the short green wavelengths.

FIG. 8A illustrates an enhanced view 800A of the chromaticity diagram 400 of FIG. 4. As shown in the view 800A, both the short blue primary BS and the long blue primary BL lie outside of the Rec2020 color gamut 402. Both primaries are to be out towards the boundary of the Rec2020 color gamut 402. Here, the primaries are bound to the Rec2020 gamut 402 by defining an intersection point of a line D between the long blue primary and the short green wavelength with the Rec2020 boundary. This location is then used to define the blend matrices. The dot E illustrates the point at which the gamut A blue primary lies.

Another method is to not bind the blue primaries to the Rec2020 gamut, for example, to maximize the coverage of the resulting gamut. FIG. 8B illustrates an enhanced view 800B of the chromaticity diagram 400 of FIG. 4. Here, the point of longest distance from a line between the red and green primaries of the Rec2020 gamut to the mixture of the long blue (BL) and short green (GS) wavelengths. This location is then used to define the blend matrices. As illustrated, the long blue primary is used for gamut A while the short blue primary is used for gamut B.

In some embodiments as disclosed in previous paragraphs, a threshold value can be used to split the pixel RGB codeword range between the 'A' and 'B' gamuts. Then the pixels in the 'B' gamut can be clipped against the edge of that gamut. The residual (the part lost by clipping) is added back into the 'A' gamut for processing. On the other hand, in some other embodiments, the threshold can be subtracted from the input pixels to yield positive and negative values. Then the process pushes those into the 'B' gamut, clips the result, pushes that residual into the 'A' gamut. This technique makes more utilization of the 'B' gamut which reduces clipping overall. The following sections 3-3.2 show examples of the disclosed embodiments.

In some embodiments as disclosed in previous paragraphs, a matrix is applied to convert the source to the target ('A' or 'B' gamut), which may lead to negative RGB values to be clipped. Also the hue shifts may be challenging to manage. On the other hand, in some other embodiments, a clipping method is used for representing colors that do not fit into the 3-dimensional color volume. The technique preserves hue and merely desaturates the clipped pixels. This makes the color grading process much easier. As the colorist pushes luminance or saturation and hits the edge of the 3-dimensional color volume, they will just see desaturation which is intuitive to identify.

The above projection systems and methods may provide for the rending of wide color gamut imaging. Systems, methods, and devices in accordance with the present disclosure may take any one or more of the following configurations.

(1) A projection system comprising: a first projection device; a second projection device; at least one spatial modulator; and an electronic processor configured to: receive a two-dimensional video data, generate, from the video data, a first plurality of intensity values of virtual primaries of a first color gamut and a second plurality of intensity values of virtual primaries of a second color gamut, subtract a luminance threshold from a plurality of pixel values of the second color gamut to yield a plurality of positive pixel values and a plurality of negative pixel values, set respective ones of the plurality of negative pixel values of the second color gamut to predetermined values to obtain a residual of the second color gamut, add the residual of the second color gamut to the first color gamut, add maximized pixel values to the first color gamut and the second color gamut within the two-dimensional image data to create an output gamut, blend the output gamut with a native color gamut of the projection system to generate a blended gamut, and drive the first projection device and the second projection device based on the blended gamut.

(2) The projection system according to (1), wherein the electronic processor is further configured to: subtract a luminance threshold from a plurality of pixel values of the first color gamut to yield a second plurality of positive pixel values and a second plurality of negative pixel values, and set respective ones of the second plurality of negative pixel values of the first color gamut to predetermined values to obtain a residual of the first color gamut.

(3) The projection system according to any one of (1) to (2), wherein the first color gamut is composed of a first red wavelength, a first green wavelength, and a first blue wavelength, wherein the second color gamut is composed of a second red wavelength, a second green wavelength, and a second blue wavelength, wherein the first red wavelength is different than the second red wavelength, wherein the first green wavelength is different than the second green wavelength, and wherein the first blue wavelength is different than the second blue wavelength.

(4) The projection system according to any one of (1) to (3), wherein the native color gamut of the projection system is a gamut in which the projection system drives both the first color gamut and the second color gamut equally.

(5) The projection system according to any one of (1) to (4), wherein the first projection device projects a first image composed of a first blend of the first color, and wherein the second projection device projects a second image composed of a second blend of the second color gamut.

(6) The projection system according to any one of (1) to (5), wherein the electronic processor is further configured to generate the first plurality of intensity values of virtual primaries of the first virtual color gamut and the second plurality intensity values of a second virtual color gamut based on a comparison with the luminance threshold.

(7) The projection system according to (6), wherein the electronic processor is further configured to convert the first plurality of intensity values into a third plurality of intensity values of predefined primaries of a first projection head of a display system and the second plurality of intensity values into a fourth plurality of intensity values of predefined primaries of a second projection head of the display system.

(8) The projection system according to any one of (1) to (7), wherein blending the output gamut with the native gamut includes adding maximized pixel values to the native color gamut.

(9) The projection system according to any one of (1) to (8), wherein the luminance threshold is a vector based on a relationship between the first color gamut and the second color gamut in a predefined color space.

(10) The projection system according to any one of (1) to (9), wherein blending the output gamut with the native color gamut maintains a hue of the two-dimensional video data or preserves a chromaticity of the two-dimensional video data.

(11) A method of rendering wide color gamut images with a projection system including a first projection device, a second projection device, and at least one spatial modulator, the method comprising: receiving a two-dimensional video data, a first plurality of intensity values of virtual primaries of a first color gamut and a second plurality of intensity values of virtual primaries of a second color gamut, subtracting a luminance threshold from a plurality of pixel values of the second color gamut to yield a plurality of positive pixel values and a plurality of negative pixel values, setting respective ones of the plurality of negative pixel values of the second color gamut to predetermined values to obtain a residual of the second color gamut, adding the residual of the second color gamut to the first color gamut, adding maximized pixel values to the first color gamut and the second color gamut within the two-dimensional image data to create an output gamut, blending the output gamut with a native color gamut of the projection system to generate a blended gamut, and driving the first projection device and the second projection device based on the blended gamut.

(12) The method according to (11), the method further comprising: subtracting a luminance threshold from a plurality of pixel values of the first color gamut to yield a second plurality of positive pixel values and a second plurality of negative pixel values, and setting respective ones of the second plurality of negative pixel values of the first color gamut to predetermined values to obtain a residual of the first color gamut.

(13) The method according to any one of (11) to (12), wherein the first color gamut is composed of a first red wavelength, a first green wavelength, and a first blue wavelength, wherein the second color gamut is composed of a second red wavelength, a second green wavelength, and a second blue wavelength, wherein the first red wavelength is different than the second red wavelength, wherein the first green wavelength is different than the second green wavelength, and wherein the first blue wavelength is different than the second blue wavelength.

(14) The method according to any one of (11) to (13), wherein the native color gamut of the projection system is a gamut in which the projection system drives both the first color gamut and the second color gamut equally.

(15) The method according to any one of (11) to (14), wherein the first projection device projects a first image composed of a first blend of the first color gamut, and wherein the second projection device projects a second image composed of a second blend of the second color gamut.

(16) The method according to any one of (11) to (15), wherein the method further comprises generating the first plurality of intensity values of virtual primaries of the first virtual color gamut and the second plurality intensity values of a second virtual color gamut based on a comparison with the luminance threshold.

(17) The method according to (16), wherein the method further comprises converting the first plurality of intensity values into a third plurality of intensity values of predefined primaries of a first projection head of a display system and the second plurality of intensity values into a fourth plurality of intensity values of predefined primaries of a second projection head of the display system.

(18) The method according to any one of (11) to (17), wherein blending the output gamut with the native gamut includes adding maximized pixel values to the native color gamut.

(19) The method according to any one of (11) to (18), wherein the luminance threshold is a vector based on a relationship between the first color gamut and the second color gamut in a predefined color space.

(20) A non-transitory computer-readable medium storing instruction that, when executed by a processor of a projection system, cause the projection system to perform operations comprising the method according to claim 11.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A projection system capable of displaying images using six predefined primaries including a first distinct set of predefined primaries and a second distinct set of predefined primaries comprising:
   at least one spatial modulator; and
   an electronic processor configured to:
     receive two-dimensional video data; and
     generate, from the video data, a first plurality of intensity values of virtual primaries of a first color gamut, said virtual primaries of the first color gamut being a first combination of the predefined primaries such that the first color gamut approximates a predefined color gamut, and a second plurality of intensity values of virtual primaries of a second color gamut, said second color gamut being defined by the remaining energy output of the predefined primaries after the energy of the virtual primaries of the first color gamut has been subtracted;

wherein the electronic processor is further configured to generate said second plurality of intensity values of the virtual primaries of the second color gamut by:
  subtracting a luminance threshold from the respective intensity values of the corresponding channels of the received video data to generate a third plurality of intensity values, said third plurality of intensity values including a plurality of positive intensity values and a plurality of negative intensity values;
  setting the plurality of negative intensity values of the second color gamut to predetermined values to obtain a residual of the second color gamut; and
  generating said second plurality of intensity values as said residual;
wherein the electronic processor is further configured to generate said first plurality of intensity values of the virtual primaries of the first color gamut by:
  subtracting said second plurality of intensity values from the received video data to generate a remainder of the received video data,
  generating a fourth plurality of intensity values based on said remainder,
  adding maximized pixel values to the fourth plurality of intensity values to generate said first plurality of intensity values;
wherein the electronic processor is further configured to:
  calculate drive values for the at least one spatial modulator using said first and second plurality of intensity values, said drive values defining an output gamut of the projection system;
  blend the output gamut with a native color gamut of the projection system to generate final drive values, said native color gamut being defined as a set of primaries that drives said first and second distinct sets of predefined primaries equally; and
  drive the at least one spatial modulator based on said final drive values.

2. The projection system according to claim 1, wherein the first distinct set of predefined primaries includes a first red wavelength, a first green wavelength, and a first blue wavelength, wherein the second distinct set of predefined primaries includes a second red wavelength, a second green wavelength, and a second blue wavelength, wherein the first red wavelength is different than the second red wavelength, wherein the first green wavelength is different than the second green wavelength, and wherein the first blue wavelength is different than the second blue wavelength.

3. The projection system according to claim 1, wherein blending the output gamut with the native color gamut includes adding maximized pixel values to the native color gamut.

4. The projection system according to claim 1, wherein the luminance threshold is a vector based on a relationship between the first color gamut and the second color gamut in a predefined color space.

5. The projection system according to claim 1, wherein blending the output gamut with the native color gamut maintains a hue of the two-dimensional video data.

6. A method of rendering wide color gamut images with a projection system capable of displaying images using six predefined primaries including a first distinct set of predefined primaries and a second distinct set of predefined primaries, said projection system including at least one spatial modulator, the method comprising:
  receiving two-dimensional video data;
  generating, from the video data, a first plurality of intensity values of virtual primaries of a first color gamut, said virtual primaries of the first color gamut being a first combination of the predefined primaries such that the first color gamut approximates a predefined color gamut, and a second plurality of intensity values of virtual primaries of a second color gamut, said second color gamut being defined by the remaining energy output of the predefined primaries after the energy of the virtual primaries of the first color gamut has been subtracted,
  wherein generating said second plurality of intensity values of the virtual primaries of the second color gamut comprises:
    subtracting a luminance threshold from the respective intensity values of the corresponding channels of the received video data to generate a third plurality of intensity values, said third plurality of intensity values including a plurality of positive intensity values and a plurality of negative intensity values,
    setting the plurality of negative intensity values of the second color gamut to predetermined values to obtain a residual of the second color gamut, and
    generating said second plurality of intensity values as said residual,
  wherein generating said first plurality of intensity values of the virtual primaries of the first color gamut comprises:
    subtracting said second plurality of intensity values from the received video data to generate a remainder of the received video data,
    generating a fourth plurality of intensity values based on said remainder, and
    adding maximized pixel values to the fourth plurality of intensity values to generate said first plurality of intensity values;
  calculating drive values for the at least one spatial modulator using said first and second plurality of intensity values, said drive values defining an output gamut of the projection system;
  blending the output gamut with a native color gamut of the projection system to generate final drive values, said native color gamut being defined as a set of primaries that drives said first and second distinct sets of predefined primaries equally; and
  driving the at least one spatial modulator based on said final drive values.

7. The method according to claim 6, wherein the first distinct set of predefined primaries includes a first red wavelength, a first green wavelength, and a first blue wavelength, wherein the second distinct set of predefined primaries includes a second red wavelength, a second green wavelength, and a second blue wavelength, wherein the first red wavelength is shorter than the second red wavelength, wherein the first green wavelength is shorter than the second green wavelength, and wherein the first blue wavelength is shorter than the second blue wavelength.

8. The method according to claim 6, wherein blending the output gamut with the native color gamut includes adding maximized pixel values to the native color gamut.

9. The method according to claim 6, wherein the luminance threshold is a vector based on a relationship between the first color gamut and the second color gamut in a predefined color space.

10. The method according to claim 6, wherein blending the output gamut with the native color gamut maintains a hue of the two-dimensional video data.

11. A non-transitory computer-readable medium storing instructions that, when executed by a processor of a projection system capable of displaying images using six predefined primaries including a first distinct set of predefined primaries and a second distinct set of predefined primaries, said projection system including at least one spatial modulator, cause the projection system to:
- receive two-dimensional video data;
- generate, from the video data, a first plurality of intensity values of virtual primaries of a first color gamut, said virtual primaries of the first color gamut being a first combination of the predefined primaries such that the first color gamut approximates a predefined color gamut, and a second plurality of intensity values of virtual primaries of a second color gamut, said second color gamut being defined by the remaining energy output of the predefined primaries after the energy of the virtual primaries of the first color gamut has been subtracted,
- wherein the instructions cause the projection system to generate said second plurality of intensity values of the virtual primaries of the second color gamut by:
  - subtracting a luminance threshold from the respective intensity values of the corresponding channels of the received video data to generate a third plurality of intensity values, said third plurality of intensity values including a plurality of positive intensity values and a plurality of negative intensity values,
  - setting the plurality of negative intensity values of the second color gamut to predetermined values to obtain a residual of the second color gamut, and
  - generating said second plurality of intensity values as said residual,
- wherein the instructions cause the projection system to generate said first plurality of intensity values of the virtual primaries of the first color gamut by:
  - subtracting said second plurality of intensity values from the received video data to generate a remainder of the received video data,
  - generating a fourth plurality of intensity values based on said remainder, and
  - adding maximized pixel values to the fourth plurality of intensity values to generate said first plurality of intensity values;
- calculate drive values for the at least one spatial modulator using said first and second plurality of intensity values, said drive values defining an output gamut of the projection system;
- blend the output gamut with a native color gamut of the projection system to generate final drive values, said native color gamut being defined as a set of primaries that drives said first and second distinct sets of predefined primaries equally; and
- drive the at least one spatial modulator based on said final drive values.

12. The non-transitory computer-readable medium according to claim 11, wherein the first distinct set of predefined primaries includes a first red wavelength, a first green wavelength, and a first blue wavelength, wherein the second distinct set of predefined primaries includes a second red wavelength, a second green wavelength, and a second blue wavelength, wherein the first red wavelength is different than the second red wavelength, wherein the first green wavelength is different than the second green wavelength, and wherein the first blue wavelength is different than the second blue wavelength.

13. The non-transitory computer-readable medium according to claim 11, wherein the instructions that cause the projection system to blend the output gamut with the native color gamut include instructions that cause the projection system to add maximized pixel values to the native color gamut.

14. The non-transitory computer-readable medium according to claim 11, wherein the instructions that cause the projection system to blend the output gamut with the native color gamut cause the projection system to blend the output gamut with the native color gamut such that the native color gamut maintains a hue of the two-dimensional video data.

\* \* \* \* \*